Jan. 11, 1938. J. TJAARDA 2,105,171
VEHICLE WHEEL AND SPRING SUSPENSION
Filed Jan. 17, 1936 2 Sheets-Sheet 1
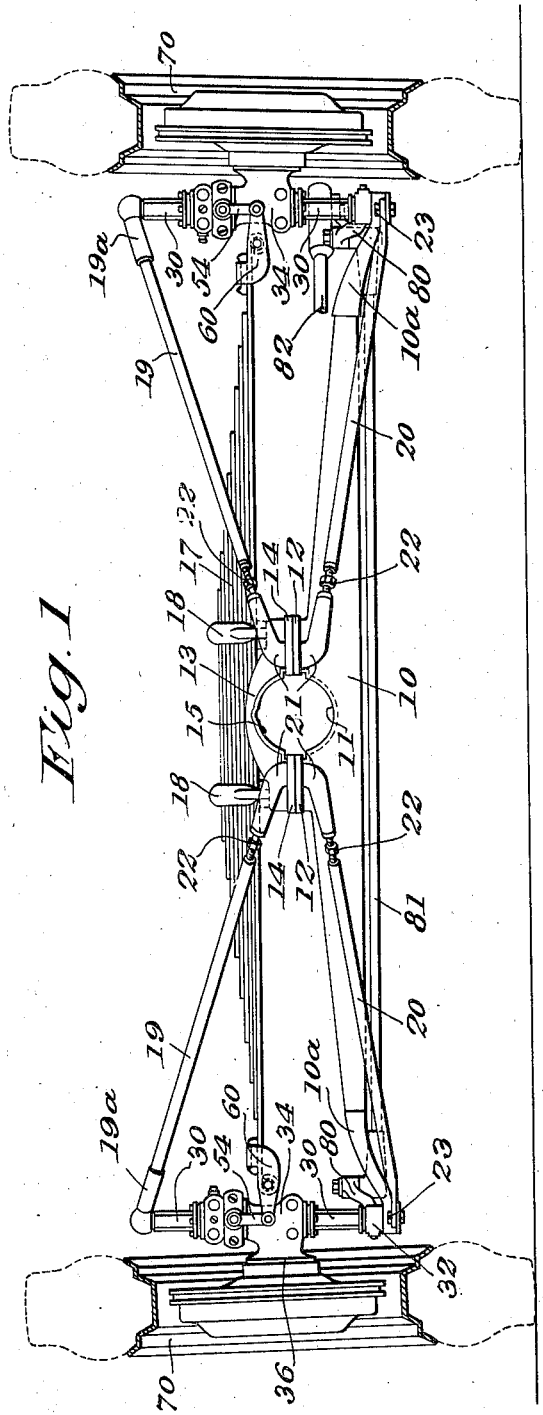
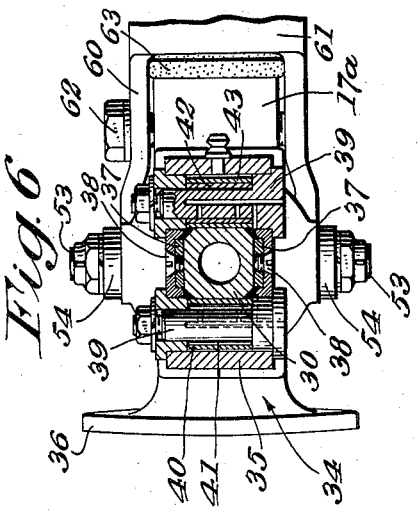
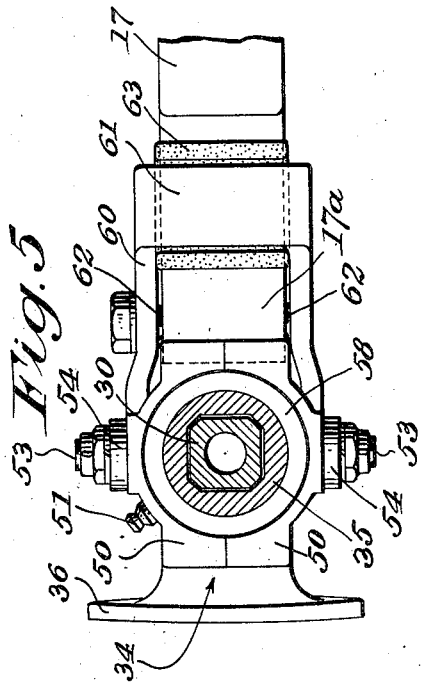
Inventor:
John Tjaarda
By Dike, Calver & Gray
Attorneys Jan. 11, 1938.   J. TJAARDA   2,105,171
VEHICLE WHEEL AND SPRING SUSPENSION
Filed Jan. 17, 1936   2 Sheets-Sheet 2

Inventor:
John Tjaarda
By Dike, Calvert Gray
Attorneys.

Patented Jan. 11, 1938

2,105,171

UNITED STATES PATENT OFFICE 2,105,171

VEHICLE WHEEL AND SPRING SUSPENSION

John Tjaarda, Birmingham, Mich., assignor to Briggs Manufacturing Company, Detroit, Mich., a corporation of Michigan Application January 17, 1936, Serial No. 59,508

4 Claims. (Cl. 267—19)

This invention relates to vehicles, such as motor vehicles, and more particularly to improvements pertaining to the automotive axle construction, wheel and spring suspension, and steering mechanism for automotive vehicles.

One of the objects of the present invention is to provide a construction permitting a low center of gravity of the vehicle and one wherein shocks to one of the wheels and its steering spindle assembly are readily absorbed without materially disturbing the position or angularity of the vehicle body and are not transmitted to the opposite front wheel and steering spindle assembly, thus providing substantially independently sprung wheels.

Another object of the invention is to provide an improved front axle construction and front wheel mounting wherein the wheels are independently sprung with respect to the steering mechanism.

A further object of the invention is to provide a front or rear axle construction of the foregoing character including improved spring mountings.

Another object of the invention is to provide a front axle construction and frictionless front wheel mounting of sturdy construction capable of withstanding shocks, and in which the parts show a minimum of wear after extended periods of use.

The above and other objects of the invention will appear from the following description and appended claims when considered in connection with the accompanying drawings forming a part of this specification.

In said drawings:

Fig. 1 is a front elevation of a front axle construction, wheel suspension and part of the steering mechanism of a vehicle, embodying the present invention.

Fig. 5 is a horizontal section taken substantially along the line 5—5 of Fig. 2 in the direction of the arrows.

Fig. 6 is a horizontal section taken substantially along the line 6—6 of Fig. 2 in the direction of the arrows.

Figure 2:
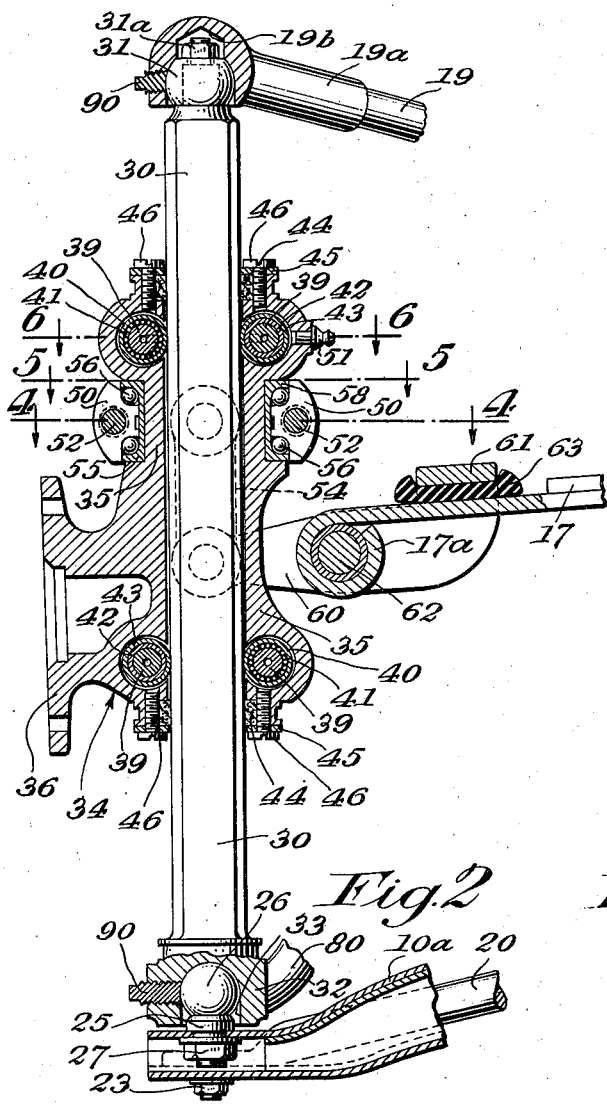
Fig. 2 is a detail vertical sectional view, partly in elevation, showing one of the front wheel mountings.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now particularly to the drawings, I have shown, by way of example, one form of construction embodying my invention in which the vehicle front axle construction comprises a transverse truss or supporting member 10 of channel formation which is preferably of greater width at its central portion than at its end portions 10a. The central or intermediate portion of the truss member is provided with a laterally extending depression or socket 11 and has secured to the top face thereof, on opposite sides of the depression, reenforcing plates 12. A cap member 13 having plates 14 and a socket 15, complementary to the socket 11, is secured in place upon the plates 12 and the truss member in any suitable manner, as by means of bolts (not shown). A transverse multiple leaf spring 17 is seated upon and secured to the cap member 13. This spring member is held in place by means of U-bolts 18. As shown, the spring is just slightly shorter in length than the truss member and overlies the same. The cooperating socket members 11 and 15 together provide connecting means for a torque tube or central longitudinal frame member (not shown) of the vehicle chassis.

Extending from each end of the cooperating reenforcing plates 12 and 14 toward the ends 10a of the truss member is a pair of substantially V-shaped outwardly diverging brace members, each pair comprising an upper brace rod 19 and a lower brace rod 20. The inner ends of the brace rods are secured at 21 to the plates 12 and 14 in any suitable manner. Each rod 19 and 20 preferably is sectioned and provided with an adjusting turn buckle 22 for the purpose of lengthening or shortening the rods. Only two pairs of brace members appear in Fig. 1 but it will be understood that two corresponding additional pairs may be employed and located on the opposite side of the spring member 17. These brace members are designed to function as both tension and compression members to brace the wheel king pins hereinafter described The outer ends of the lower brace members 20 are secured by bolts 23 to the ends 10a of the truss member. The outer end of each of the upper brace members 19 fits into a cap member 19a having formed in its under face a socket 19b (Fig. 2) for a purpose to be described below.

Figure 3:
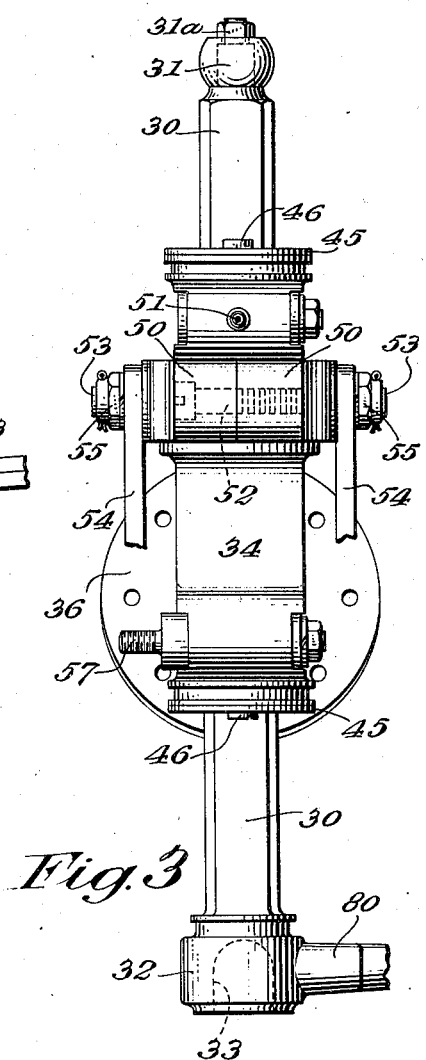
Fig. 3 is a detail elevational view looking toward the left of Fig. 2 with certain parts removed for clarity.

Referring particularly to Fig. 2, it will be seen that each of the outer ends 10a of the truss member has secured thereto a stud member 25 which is held in place by a nut 27. The stud member has a ball head portion 26. Thus the truss member has an upstanding ball-like projection adjacent each of its ends and the outer end of each upper brace member 19 carries a socketed head or cap member 19a which is disposed above and spaced from each of the ball members 26. A king pin 30 is adapted to be positioned between each opposed pair of members 19a and 26. Each king pin carries at its upper end a ball-like sleeve 31 held in place upon the reduced upper end of the king pin by a nut 31a (Figs. 2 and 3). The head 31 fits within the socket 19b, Fig. 2. The lower end of the king pin is provided with an enlarged portion 32 having a socket 33 formed therein, this socket being adapted to receive the ball head 26. The enlarged portion 32 is preferably provided with an integral offset socket portion (not shown) which is adapted to connect with and support one of the elements of the steering mechanism to be described hereinafter. Suitable means may be provided for interlocking the ball-like sleeve 31 and the ball member 26 within their respective sockets 19b and 33 to prevent separation or disconnection of the parts. Such means may comprise, as shown in Fig. 2, an adjusting bolt or plug member 90 which is threaded into a tapped hole in each of the parts 19a and 32, the inner end of the bolt being machined to conform to the curvature of the ball. Thus the bolt may be adjusted so that the inner end thereof will embrace the ball snugly and prevent disconnection of the ball and socket while permitting free relative rotative movement of the parts. Each of the king pins 30 is thus mounted for rotation or oscillation relative to the head 26 and the socket 19b. The king pin is, as shown, of substantially square cross section and supports the correspondingly socketed sleeve portion 35 of the steering spindle block or body portion, shown as a whole at 34. The body portion 34 is provided with the usual circular hub plate 36 for attachment to a wheel and supports a conventional wheel spindle (not shown).

Figure 4:
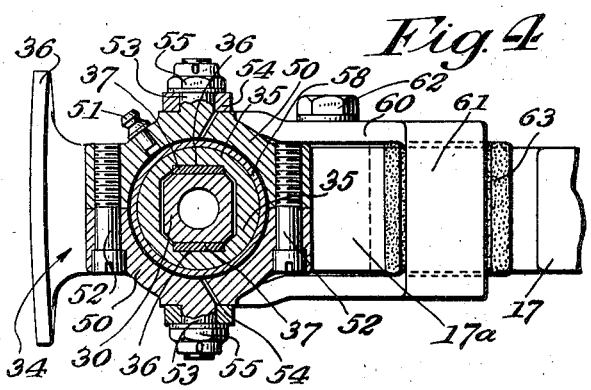
Fig. 4 is a horizontal section taken substantially along the line 4—4 of Fig. 2 in the direction of the arrows.

Referring particularly to Figs. 4 and 5, it will be seen that the corners of the king pin 30 and the corresponding corners of the socket portion of the sleeve 35 are mitered. It will also be seen that opposed inner faces of the sleeve 35 are provided with longitudinal key-ways 36 which are adapted to receive guide or locating plates 37 which engage the corresponding and oppositely disposed outer faces of the king pin 30 and thus prevent any relative rotative or oscillating movement or slippage between the sleeve 35 and the king pin. As seen in Fig. 6 these guide plates 37 are preferably secured to the sleeve by means of screws or the like 38. While preventing relative rotative movement of the parts, the sleeves permit relative axial or longitudinal movement thereof. The sleeve portion 35 of the steering spindle block or body is provided adjacent its upper and lower ends with laterally extending recesses which receive pairs of anti-friction bearing assemblies including grease fittings or bolts 39. The upper left hand socket (Fig. 2) contains the grease fitting or bolt 39 which is surrounded by a needle bearing assembly comprising a tube or cylinder 40 of a diameter somewhat greater than that of the grease fitting 39, between which and said fitting a series of needle bearings 41 is provided. The same sort of combined grease fitting and needle bearing assembly is provided in the lower right hand socket. The upper right hand socket and the lower left hand socket contain combined roller bearing and grease fitting assemblies in which the grease fittings 39 are located within a pair of concentric bearing sleeves, the inner sleeve being shown at 42 and the outer sleeve at 43. Thus there is provided spaced bearing assemblies for the sleeve which contact the king pin and permit frictionless axial or vertical movement of the sleeve and associated parts relative to the king pin. The upper and lower ends of the sleeve 35 are provided with packing material 44 which engages the king pin and is held in place by a metal ring or cap 45 secured to the sleeve by means of cap screws or the like 46. Thus the leakage of grease or other lubricant is prevented.

A reduced portion of the sleeve 35 is provided with means for connecting the steering spindle assembly with the end of the leaf spring 17. As best shown in Fig. 4, such means comprises a pair of split bearing portions or halves 50, one thereof being provided with a grease or lubricating fitting 51. The bearing portions or halves are secured together by means of bolts or the like 52 and each half is provided with oppositely disposed outwardly projecting threaded studs 53. The studs are adapted to receive and support the upper end of a pair of hanger link members 54 which are secured in place upon the studs by lock washers and nuts 55. The split halves include a bearing race or ring-like member 58 which, together with the spaced annular grooves formed in the halves or bearing portions 50, receive and support the two spaced series of ball bearings 56. Thus the members 50 and 58 and the spaced series of ball bearings 56 provide an anti-friction collar or bearing structure surrounding the sleeve 35, which supports the links 54 and permits rotation of the sleeve 35 and the king pin 30 relative thereto and to the links 54 and spring 17. It will be understood that the collar, while permitting rotation of the steering spindle assembly, is fixed to the reduced sleeve portion thereof so as to move axially or vertically as a unit with the sleeve and other spindle assembly parts. Each steering spindle assembly is provided with a laterally projecting bolt 57 (Fig. 3) for the connection of a shock absorber (not shown).

The hanger links 54 are pivotally attached at their lower ends to a clevis or yoke-like connecting member 60, the outer or free end of which provides a bearing portion in the form of a strap 61 which overlies the end of the leaf spring 17. The yoke 60 in turn is secured to the eye 17a of the leaf spring by a conventional shackle bolt and bushing construction 62, the strap or bearing portion 61, however, being unconnected to the spring. A rubber buffer or cushion 63, shaped to receive the bearing portion 61, is interposed between this strap portion and the leaf spring 17 inwardly of the eye 17a so as to prevent any metal-to-metal contact of the bearing portion with the spring. Thus there is provided a double articulated connection or lever between each steering spindle assembly and each end of the transverse leaf spring 17, comprising links 54 and yokes 60, allowing slight relative movement of the parts during the relative upward and downward movement of the vehicle wheels 70. The cushions 63 adjacent the spring eyes 17a partially absorb road shocks to which the wheels 70 are subjected and which would otherwise be transmitted directly to the spring 17.

I have not shown a complete steering mechanism since such mechanism does not form any part of my invention. The steering linkage herein illustrated in part may be of any conventional type and in the present instance comprises a pair of arms 80, the outer ends of which are bolted to sockets formed in the lower ends 32 of the king pins. These arms 80 in turn are connected at their outer ends by means of ball and socket joints to a tie rod 81. The arm 80 at the right hand side of Fig. 1 has an offset portion which is connected in conventional manner to a drag link 82, the drag link being in turn connected to the steering gear (not shown) of the vehicle. Thus when the steering gear is actuated, rotative or oscillating movement is imparted to both king pins 30 which in turn causes rotation or oscillation of their respective steering spindle assemblies to effect the steering of the vehicle without in any way affecting the position of the leaf spring 17 and its end connections with the steering spindle assemblies.

From the foregoing it will be seen that each of the wheels 70 of the vehicle and its steering spindle assembly is supported independently of the other front wheel and steering spindle assembly, thus producing independently sprung front wheels.

While I have shown a vehicle provided with transverse leaf springs it is to be understood that the present invention may be adapted for use with springs extending longitudinally of the vehicle and that the yoke-like members or clevises herein shown and described may be applied to and used in connection with various types of spring constructions.

I claim:

1. In a vehicle, a pair of steering wheels, a vertical king pin for each wheel, a sleeve fixed to each wheel and slidable on a king pin, a transverse leaf spring terminating at each end in an eye, a yoke pivotally connected to each sleeve and pivoted intermediate its ends to the spring through the medium of the spring eye, the yoke having a bearing on said spring at a point spaced inwardly from the eye, said yoke having forked ends straddling the sleeve, and hanger links connecting same to said sleeve.

2. In a vehicle, a pair of steering wheels, a vertical king pin for each wheel, a sleeve fixed to each wheel and slidable on a king pin, a transverse leaf spring terminating at each end in an eye, a yoke pivotally connected to each sleeve and pivoted intermediate its ends to the spring through the medium of the spring eye, the yoke having a bearing on said spring at a point spaced inwardly from the eye, said yoke having forked ends straddling the sleeve, hanger links connecting same to said sleeve, and a resilient cushioning member interposed between said bearing and spring.

3. In a vehicle, a front axle construction comprising a transverse truss member, brace members connected with said truss member intermediate its ends and extending outwardly in opposite directions to overlie the ends of said truss member, king pins rotatably mounted between the ends of said truss member and said brace members, steering spindle assemblies carried by said king pins and rotatable therewith and slidable axially thereof, said steering spindle assemblies including sleeve-like members through which said king pins extend, roller bearings carried by each of said sleeve members and located adjacent its opposite ends for engaging said king pin to permit frictionless longitudinal movement of said steering spindle assembly relative to said king pin, a transverse leaf spring positioned above said truss member and mounted upon an intermediate portion thereof, a non-rotatable collar mounted upon said spindle assembly sleeve within which said sleeve rotates, and means for interconnecting the collar and the end of said spring, said means including a bifurcated member pivotally connected intermediate its ends to the end of said spring and having its free end portion overlying the spring.

4. In a vehicle, a front axle construction comprising a transverse truss member, brace members connected with and extending outwardly in opposite directions from an intermediate portion of said truss member, a king pin rotatably mounted between and supported by each end of said truss member and one of said brace members, a steering spindle assembly including a body portion carried by each of said king pins, a transverse spring member supported by said truss member and having its ends movably connected to each of said steering spindle assemblies, each of said spindle body portions having pairs of sockets formed therein adjacent its upper and lower ends, and bearing assemblies located in said sockets and engaging said king pin to permit frictionless longitudinal movement of the assembly relative to said pin, certain of said bearing assemblies including needle bearings.

JOHN TJAARDA.